United States Patent [19]

Agius

[11] Patent Number: 5,562,418
[45] Date of Patent: Oct. 8, 1996

[54] ANTI-ROTATION DEVICE FOR FIN-FANS

[75] Inventor: Nicholas V. J. Agius, Edmonton, Canada

[73] Assignee: 616811 Alberta Ltd., Edmonton, Canada

[21] Appl. No.: 352,919

[22] Filed: Dec. 9, 1994

[30] Foreign Application Priority Data

Jul. 11, 1994 [CA] Canada ................................ 2127726

[51] Int. Cl.⁶ .................................................. F04D 29/04
[52] U.S. Cl. .................... 416/169 R; 416/170 R; 192/41 R; 192/45; 248/609; 248/635
[58] Field of Search ............................ 416/169 R, 169 A, 416/169 B, 170 R; 415/123, 124.2; 192/41 R, 45; 248/609, 633, 634, 635; 384/611, 620

[56] References Cited

U.S. PATENT DOCUMENTS

| | | |
|---|---|---|
| 2,090,934 | 8/1937 | Borenstein et al. . |
| 2,175,876 | 10/1939 | Chilton . |
| 2,450,708 | 10/1948 | Anderson .................. 416/170 R |
| 2,570,515 | 10/1951 | Bonham . |
| 2,714,318 | 8/1955 | Norman et al. .................. 192/41 R |
| 2,865,479 | 12/1958 | Hungerford . |
| 3,560,109 | 2/1971 | Lewis . |
| 4,601,591 | 7/1986 | Wright .................. 384/611 |
| 4,692,053 | 9/1987 | Sampedro .................. 416/169 A |
| 5,078,243 | 1/1992 | Kanai et al. .................. 192/45 |

FOREIGN PATENT DOCUMENTS

| | | | |
|---|---|---|---|
| 0270162 | 11/1912 | Germany .................. | 416/169 R |
| 2458814 | 6/1975 | Germany .................. | 248/635 |

Primary Examiner—Edward K. Look
Assistant Examiner—Christopher Verdier
Attorney, Agent, or Firm—Heslin & Rothenberg, P.C.

[57] ABSTRACT

An anti-rotation device for fin-fans is provided. The anti-rotation device provides a one-way clutch on the vertical shaft of a fin-fan to prevent backward rotation of the fin-fan in order to reduce stresses to the fin-fan system during start-up. The invention also provides a clutch adaptor to enable attachment of the one-way clutch to a variety of fin-fan installations as well as a locking system to decrease the risk of injury during maintenance operations.

23 Claims, 5 Drawing Sheets

ANTI-ROTATION DEVICE FOR FIN-FANS

FIELD OF THE INVENTION

The present invention relates to anti-rotation devices fin-fan devices to overcome the problems of windmilling when the fin-fan is non-operational.

BACKGROUND OF THE INVENTION

Refineries use large numbers of fin-fan systems to maintain cooling temperatures within various refining processes. In a typical installation, the fin-fan systems operate intermittently to automatically control the cooling air which flows over banks of cooling coils containing hot oil. A typical fin-fan unit is usually 30 feet above the ground and have fan blades ranging from 6' to 14' in diameter.

In the past, the fans of these systems have been driven by v-belts, with 15–60 horsepower motors. As a fin-fan system is typically subjected to the high temperatures, up to 250° C., generated by the particular refining process, the high temperatures result in significant slippage of the v-belt due to a high internal heat. This may result in lengthening of the v-belt which leads to the need for regular re-tensioning and increased frictional wear of the belt. The high tensioning of the belt also places abnormally high loads on both the motor shaft, the fin shaft and all bearings as well as causing the belts to elongate even more. This ultimately may require premature bearing, motor and belt replacement. The failure of belts, motors or bearings may also result in inadequate cooling of the associated process leading to costly downtime of the cooling equipment.

The replacement of belts in a fin-fan is a major job, both in view of the ambient temperatures of the area surrounding the fin-fan and the confined area where the belt is located. Furthermore, in refinery processes that are operating 24 hours a day, breakage may occur at any time, in particular when maintenance staff are off-duty which again may lead to costly down-time.

Accordingly, there has been a need for a fin-fan device that reduces the maintenance requirements for the individual fin-fan units.

In response, the industry has moved away from v-belts in favour of timing belts which offer the advantage of mating cogged surfaces to provide positive engagement between the belt and the drive sprocket. This system, however, has created additional problems which the present invention also solves.

In both v-belt and timing belt systems, fin-fans will windmill backwards when not being used as external wind and air currents move over the exposed blades. When the fin-fan is subsequently turned on, high forces are applied to the shaft, belt, bearing and electric motor to overcome the backward momentum of the entire fin-fan system. With a v-belt system, the effect of the backward momentum of the shaft may be lessened by slippage of the belt. In a v-belt system, at the moment of start-up, the belt may start to slip and effectively slow the backward momentum of the shaft and provide a smooth transition to forward rotation. However, the effect of a slipping belt greatly increases the frictional wear on the belt leading to premature replacement of the belt.

With the use of a timing belt, there is no opportunity to slow the backward movement of the shaft at the moment the motor is turned on by belt slippage as there is with a v-belt. Instead, turning the motor on results in a high current load to the motor as the motor attempts to slow and reverse the direction of the shaft in a very short period of time. The sudden torque load to the shaft may also result in breakage of the belt as the belt is subjected to high tension forces. Accordingly, as in the v-belt system, the repeating on/off cycle of a fin-fan system leads to premature motor, bearing and/or belt failure.

In addition to the direct and indirect expense of replacing belts, motors and/or bearings, the task is dangerous to undertake in view of the high temperatures and the potential for uncontrolled moving parts in the work area.

In particular, replacement of an old or broken timing belt is a problem in that the shaft may be freely rotating when the belt is being replaced. Safety considerations require that the shaft is held stationary when a new belt is mounted and tensioned on the fin-fan drive sprockets. If, for example, it is a windy day when a belt breaks or needs to be replaced, it may be extremely dangerous for a worker to enter the fin-fan area for the purposes of performing maintenance.

Accordingly, there has been a need for an anti-rotation device for fin-fans that addresses the above problems in order to reduce mechanical stress and, hence, maintenance on the fin-fan system. As well, there has been a need for an anti-rotation device that improves safety and reduces the risk to operators and maintenance personnel. In particular, there has been a need for an anti-rotation device for fin-fans that prevents backward rotation of the fin-fan when the fin-fan is non-operational. Furthermore, there has been a need for a device that is relatively simple to install on existing fin-fan systems. There has also been a need for an anti-rotation device that compensates for vibration or runout in a rotating vertical shaft to improve the reliability of the anti-rotation device. Further still, there has been a need for an anti-rotation device that prevents rotation of the fin-fan shaft during maintenance operations.

SUMMARY OF THE INVENTION

In accordance with the invention, there is provided in a fin-fan device having a vertical shaft with a fan end and a drive end, the shaft rotatable about its vertical axis, the vertical shaft having a shaft drive sprocket on the drive portion of the vertical shaft and a belt engaged with the shaft drive sprocket between the shaft drive sprocket and a motor, the motor enabling forward rotation of the vertical shaft, the improvement comprising:

a one-way clutch means on the vertical shaft for permitting one-way rotation of the vertical shaft when the motor is operational and preventing backward rotation of the shaft when the motor is non-operational, the one-way clutch having a stationary portion and a rotating portion.

In another embodiment of the invention, a one-way clutch is provided for use with the vertical shaft of a fin-fan comprising:

a clutch adaptor for engagement with the vertical shaft and a clutch shaft, the clutch adaptor having clutch shaft receiving portion for engagement with the clutch shaft and clutch flange portion for engagement with the vertical shaft, the clutch shaft receiving portion having an internal diameter greater than the diameter of the vertical shaft.

a clutch housing having an open bore for mounting a one-way clutch bearing and a base plate, the open bore having a shaft receiving end for receiving the clutch shaft and a base plate end, the base plate for covering the base plate end.

In a specific embodiment of the invention, an anti-rotation fin-fan device is provided comprising:

a vertical shaft having a fan end with fan blades and a drive end, the vertical shaft rotatable about its vertical axis;

a shaft drive sprocket on the drive portion of the vertical shaft;

a shaft bushing on the drive end of the vertical shaft, the shaft bushing having a keyway to provide positive engagement between the vertical shaft and shaft bushing, the vertical shaft having a shaft receiving portion for receiving the vertical shaft and a shaft bushing flange, the shaft bushing flange having threaded bores;

a clutch adaptor for engagement with the shaft bushing and a clutch shaft, the clutch adaptor having clutch shaft receiving portion for engagement with the clutch shaft and clutch flange portion for engagement with the shaft bushing flange, the clutch shaft receiving portion having an internal diameter greater than the diameter of the vertical shaft, the clutch adaptor flange having bores for alignment with the threaded bores, the bores for receiving respective bolts for engagement of the clutch adaptor to the shaft bushing;

a clutch housing having an open bore for mounting a top seal, one-way clutch bearing and a base plate, the open bore having a shaft receiving end for receiving the clutch shaft within the one-way clutch bearing and a base plate end, the base plate for covering the base plate end;

a vibration damping bushing for attachment to the base plate for absorbing vibrational movement of the fin-fan device;

a locking pin for preventing rotation of the clutch adaptor with respect to the base plate, the locking pin engageable with both the clutch adaptor and base plate.

Furthermore, in accordance with an alternate embodiment of the invention, a one-way clutch device is provided for use with a rotating vertical shaft having an exposed lower end for preventing rotation of the vertical shaft in one direction, the one-way clutch device comprising:

a one way clutch means operatively engaged between the vertical shaft adjacent the lower end and an immoveable surface;

a thrust bearing means on the lower end of the vertical shaft for supporting the one-way clutch means on the vertical shaft.

In accordance with a specific embodiment of the invention, a one-way clutch device is provided for use with a rotating vertical shaft having an exposed lower end for preventing rotation of the vertical shaft in one direction, the one-way clutch device comprising:

a shaft bushing on the exposed lower end of the vertical shaft, the shaft bushing having a keyway to provide positive engagement between the vertical shaft and shaft bushing, the shaft bushing having a shaft receiving portion for receiving the vertical shaft and a shaft bushing flange, the shaft bushing flange having threaded bores;

a clutch adaptor for engagement with the shaft bushing and a clutch shaft, the clutch adaptor having a clutch shaft receiving portion for engagement with the clutch shaft and a clutch flange portion for engagement with the shaft bushing flange, the clutch adaptor having an internal diameter greater than the diameter of the vertical shaft, the clutch adaptor flange having bores for alignment with the threaded bores, the bores for receiving respective bolts for engagement of the clutch adaptor to the shaft bushing;

a clutch housing having an open bore, the clutch housing for mounting a top seal, a one-way clutch bearing, thrust bearing and a base plate, the open bore having a shaft receiving end for receiving the clutch shaft within the one-way clutch bearing and a base plate end, the base plate for covering the base plate end, the thrust bearing engaged on the lower end of the vertical shaft with an end plate for supporting the clutch housing on the vertical shaft;

a locking pin for preventing rotation of the clutch adaptor with respect to the base plate, the locking pin engageable with both the clutch adaptor and base plate;

a non-rigid link between the clutch housing and the immoveable surface for preventing rotation of the clutch housing.

BRIEF DESCRIPTION OF THE DRAWINGS

These and other features of the invention will be more apparent from the following description in which reference is made to the appended drawings wherein:

FIG. 3a is a cross-sectional view of the shaft and bushing in accordance with the invention along the line 3a—3a;

DETAILED DESCRIPTION OF THE INVENTION

Figure 1:
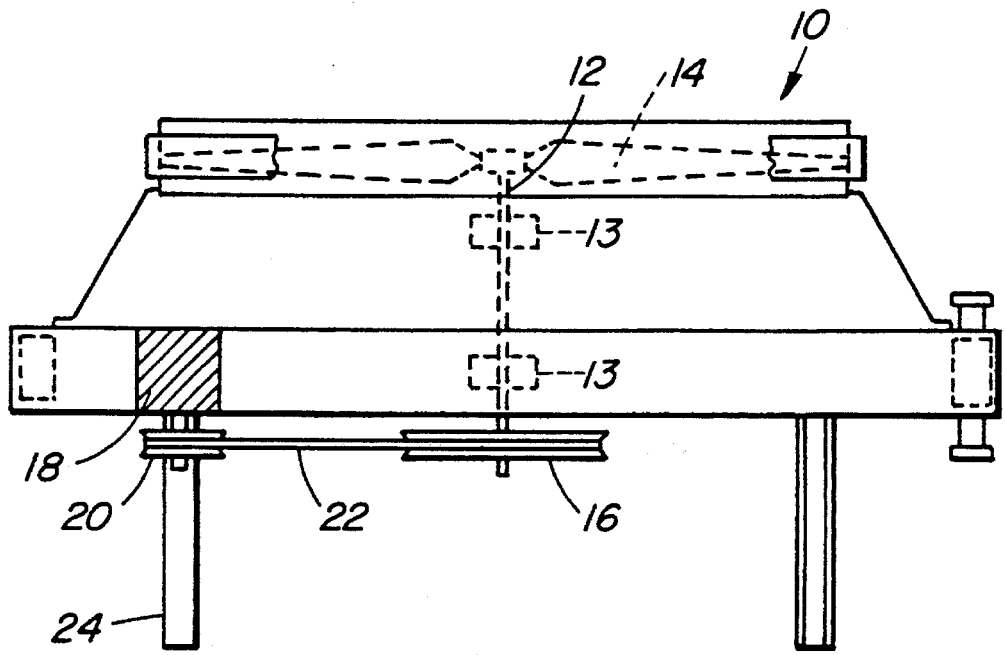
FIG. 1 is a schematic diagram of a typical fin-fan system with a belt drive.
Figure 2:
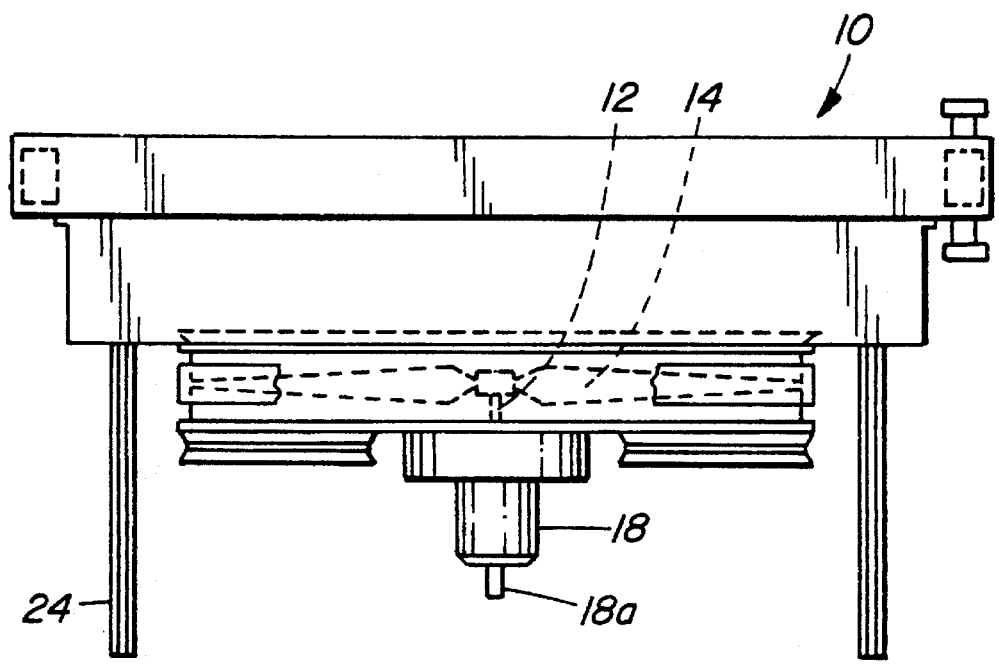
FIG. 2 is a schematic diagram of a typical direct-drive fin-fan system.

A typical fin-fan 10 is shown in FIGS. 1 and 2 for use in a refinery installation. Generally, a fin-fan 10 has a vertical shaft 12 on bearings 13 with fan blades 14 at the upper end of the shaft and a drive sprocket 16. In the fin-fan system shown in FIG. 1, a motor 18 is located laterally to the drive sprocket 16 with motor drive sprocket 20. A belt 22 connects the drive sprocket 16 to the motor drive sprocket 20. In the fin-fan system 10 shown in FIG. 2, the motor 20 is connected directly to the vertical shaft 12. Both fin-fan systems 10 of FIGS. 1 and 2 are supported by frame 24 which may be of any suitable form to adequately support a particular fin-fan design 10.

In the embodiment shown in FIG. 1, actuation of the motor 18 rotates vertical shaft 12 through motor drive sprocket 20, belt 22, and drive sprocket 16 to cause the fan blades 14 to move, thereby drawing cooling air downwardly into the installation. Operation of the motor 18 is controlled in accordance with the specific installation and the required cooling requirements of a particular process, typically thermostatically controlled in response to a temperature rise above a pre-set value in a series of cooling tubes (not shown). The motor 18 is typically a 6–40 kilowatt motor (10–60 hp), running at 1200 rpm with a drive sprocket to motor drive sprocket ratio of 6–7:1.

When the motor is non-operational, air currents moving across the fan blades 14 will cause the fan blades 14 to windmill backwards. These air currents may be natural wind from outside the installation and/or moving air from an operational and adjacent fin fan system. The windmilling action of the fan blades 14 also causes the vertical shaft 12, drive sprocket 16, belt drive 22, motor drive sprocket 20 and motor 18 to also move in a backward direction. At this time, if the motor 20 is restarted with the system moving in this backward direction, high stress loads are placed on the motor, belt 22, bearings 13 resulting in increased wear and which may lead to premature failure of the motor 18, belt 22 and bearings 13.

Figure 3:
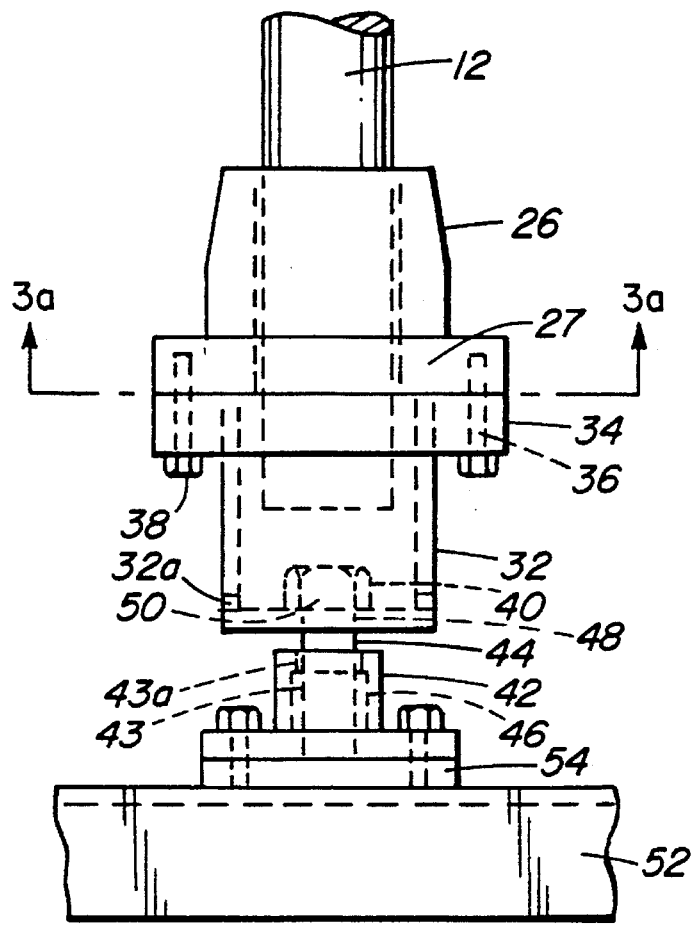
FIG. 3 is an elevation of one embodiment of the invention.
Figure 3A:
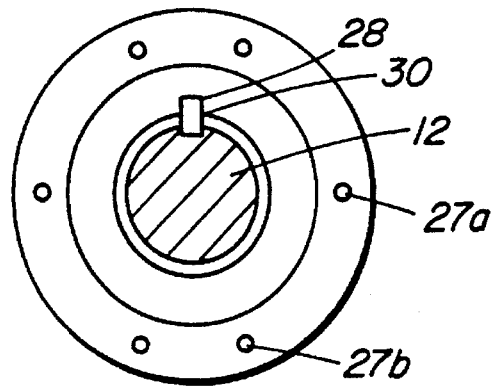

FIGS. 3 and 3a show a one-way clutch system attached to the vertical shaft 12 to prevent the backward windmilling motion of the system 10 in accordance with the invention. In general, the one-way clutch system comprises a shaft bushing 26, clutch adaptor 32, clutch housing 42, clutch bearing 43 with seal 43a, clutch shaft 44, bottom plate 54 and fixed surface 52.

The shaft bushing 26 is engaged upon the lower end of the vertical shaft 12. A keyway 28 is provided in both the shaft bushing 26 and shaft 12 with key 30 to provide positive engagement of the shaft bushing 26 with shaft 12. The lower portion of the shaft bushing 26 has a flange 27 with bore holes 27a and threaded holes 27b.

The clutch adaptor 32 is provided to engage with the lower surface of the shaft bushing 26. The clutch adaptor 32 has a flange 34 and boreholes 36 provided for attachment of the clutch adaptor 32 to the shaft bushing 26 by bolts 38. The clutch adaptor 32 is provided with an inside diameter of sufficient width to accommodate shafts 12 and keys 30 of varying diameters within the shaft bushing 32. Similarly, the depth of the shaft bushing 32 is sufficiently deep to accommodate shafts of varying lengths to provide adequate clearance between the shaft and a clutch shaft attachment device 40. In particular, this design allows the one-way clutch system to be fitted to a variety of fin-fan systems with varying shaft lengths, thereby providing ease of installation without any equipment modifications. It is also preferred that the shaft bushing 32 is also provided with weep holes 32a to provide drainage of any moisture from the clutch adaptor. As shown in FIGS. 3 and 5a, the weep holes 32a are preferably horizontal to ensure that the drainage of any moisture is influenced by the centrifugal force of the rotating shaft and directed away from the underlying components.

The clutch housing 42 with clutch shaft 44 and clutch bearing 43 is connected to the clutch adaptor 32. Clutch shaft 44 is received within the clutch adaptor 32 through bore 48 to enable clutch shaft attachment device 40 to firmly engage the clutch shaft 44 within the clutch adaptor 32. The clutch shaft attachment device is generally a jam nut 50 engaged upon a threaded end of the clutch shaft 44. The clutch shaft 44 slide fits within the clutch bearing 43 to provide positive engagement with the clutch bearing 43 for one-way rotation of the clutch shaft 44 as well as enabling removal of the clutch housing 42 and clutch bearing 43 from the clutch shaft 44. It is preferable that the clutch shaft 44 is hardened or stainless steel to improve the durability of the device. The lower surface of the clutch housing 42 is attached to bottom plate 54 which in turn is attached to a fixed surface 52. An anti-vibration assembly 58 (FIG. 4) may also be provided to absorb vibration from the rotating shaft 12 through clutch housing 42 and bottom plate 54 in the event of shaft vibration or runout. The anti-vibration assembly 54 may be a resilient rubber pad or other suitable vibration-damping material.

The clutch bearing 43 may be any suitable one-way clutch bearing that may be pressed and grease-packed within the bore 46 of the clutch housing 42. It is preferable that the one-way clutch bearing 43 is sealed to provide maintenance free operation and lubrication. In accordance with one specific embodiment of the invention, the one-way clutch bearing 43 is sealed with Dow Corning 3451 fluoro silicone grease.

It is also noted that the design of the clutch housing 42 enables replacement of the clutch bearing 43. To replace the clutch bearing 43, the clutch housing 42 containing clutch bearing 43 and seal 43a is removed from the fixed surface 52 and clutch shaft 44. Removal of bottom plate 54 exposes the lower surface of the clutch bearing 43 to enable it to be pressed out of the clutch housing 42. A new clutch bearing 43 and seal 43a may thereafter be pressed and re-greased within the clutch housing 42.

Figure 4:
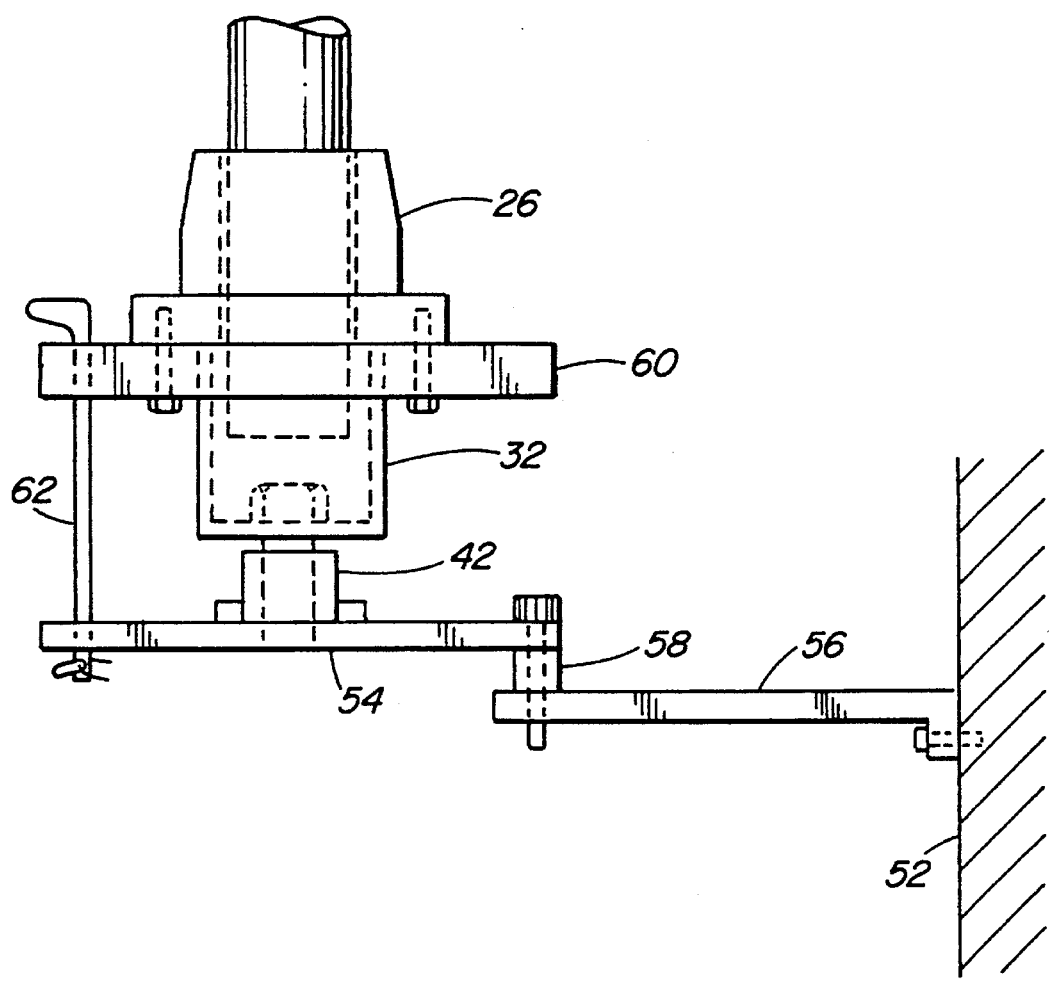
FIG. 4 is an elevation of the invention with a locking plate and pin.

FIG. 4 shows an alternate embodiment of the invention wherein the clutch housing 42 of the one-way clutch 42 is connected to a stationary surface 52 through torque arm 56. In this embodiment, the clutch housing 42 on base plate 54 is connected to the torque arm 56 through anti-vibration plug 58. The anti-vibration plug 58 is preferably made from a resiliently flexible material such as a resilient rubber plug or other suitable vibration-damping material.

As shown in FIG. 4, clutch adaptor 32 is also provided with a locking plate 60. In this embodiment, a locking pin 62 may be inserted through the locking plate 60 and base plate 62 to prevent accidental rotation of the shaft 12 during maintenance procedures.

In another embodiment of the invention, where motor 18 is connected directly to shaft 12 as shown in FIG. 2, the clutch adaptor 32, and/or shaft bushing 26 are connected directly to the motor shaft 18a.

Figure 5:
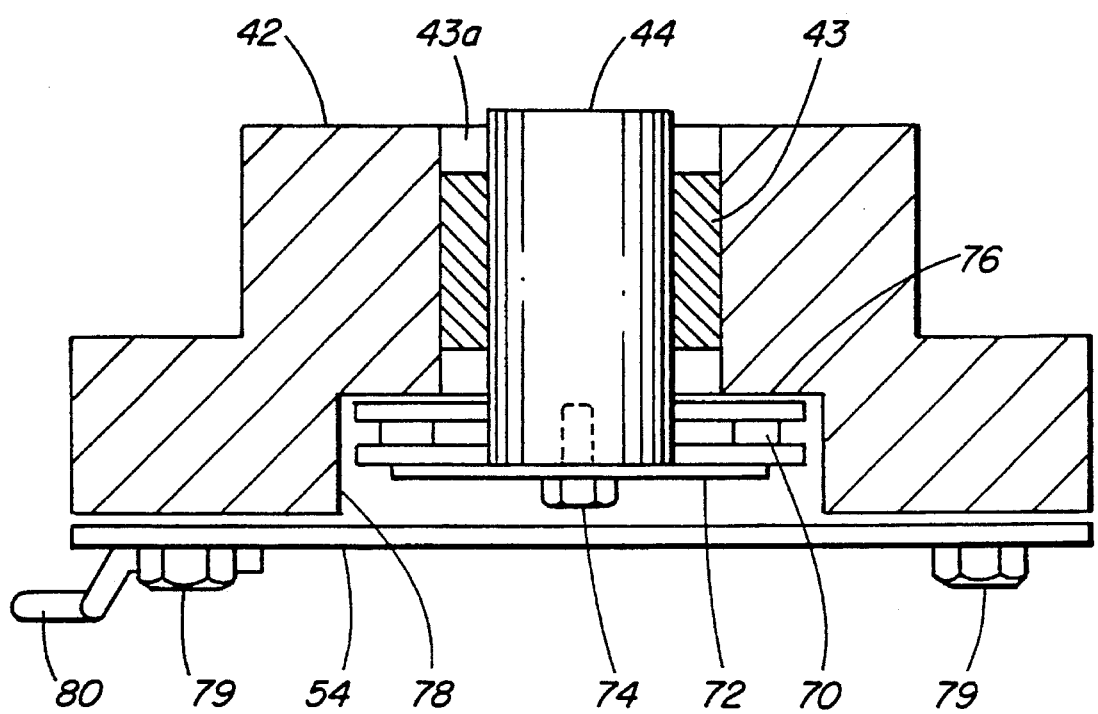
FIG. 5 is a cross-sectional view of the clutch and bushing in accordance with an alternate embodiment of the invention.
Figure 5A:
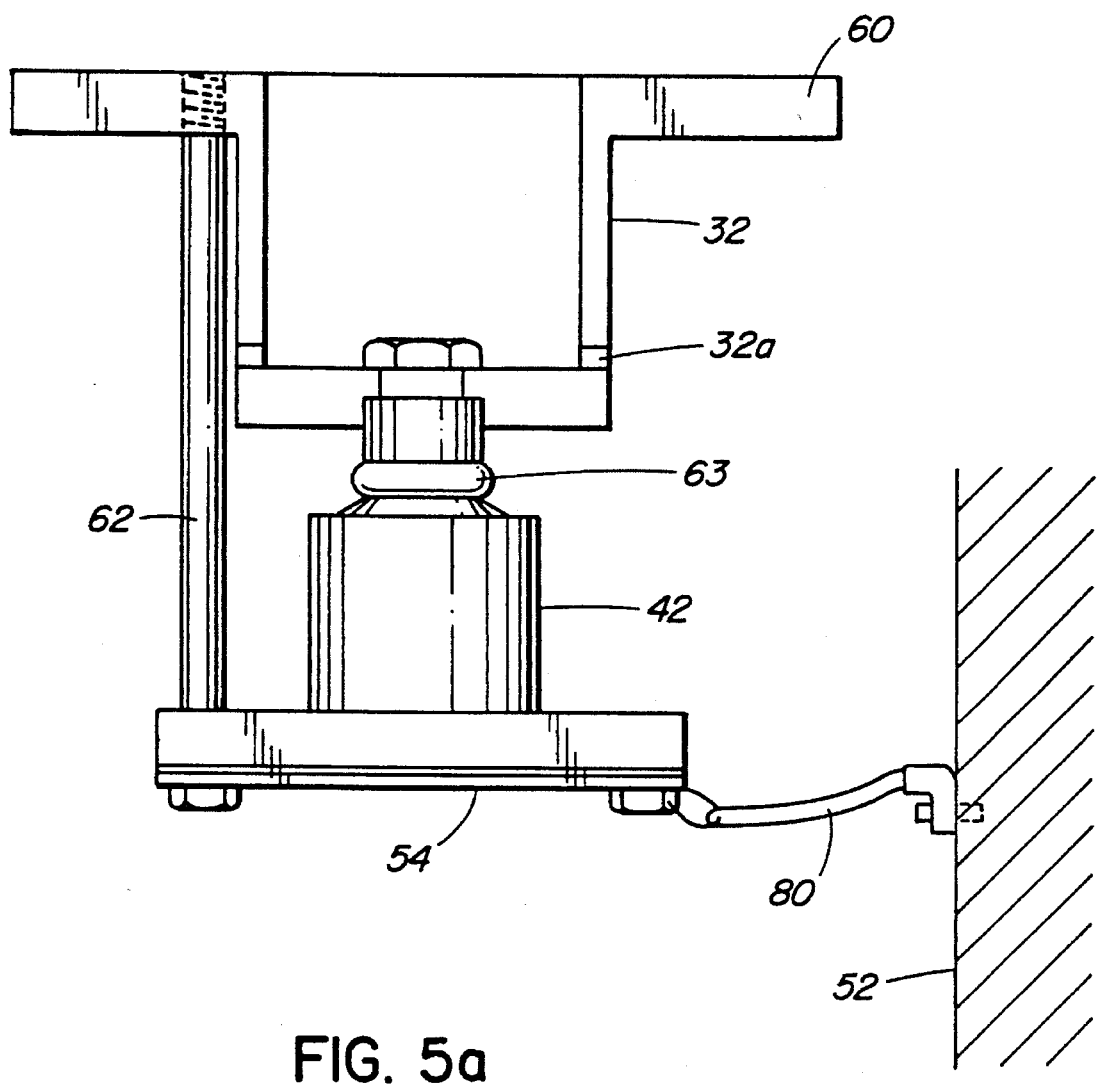
FIG. 5a is an elevation of the anti-rotation device in accordance with an alternate embodiment of the invention.

FIG. 5 shows an alternative and preferred embodiment of the invention. In this embodiment, the anti-rotation device is self-supporting, eliminating the need for a torque arm to support the clutch housing 42 thereby providing freedom of movement for any shaft vibration or runout. This design enables the anti-rotation device to be easily installed on the lower end of the vertical shaft without requiring a rigid link to a stationary surface 52. Instead of a rigid link, a flexible cable or chain 80 may be used to attach the clutch housing to a stationary surface 52. The use of a flexible cable or chain 80 also simplifies the installation of the anti-rotation device on a vertical shaft 12 as a flexible chain or cable 80 is easily adjusted in length or position to allow for attachment to a stationary surface 52. Furthermore, in the absence of a rigid link, the clutch bearing and clutch shaft are free to move with the vertical shaft 12. Accordingly, any rotational vibration or runout in the vertical shaft 12 will not substantially increase the load on the clutch bearing as the clutch housing 42 is allowed to move with any vibration.

In this embodiment, the clutch housing 42 is supported by thrust bearing 70 and end plate 72 attached to the lower end of the clutch shaft 44 by bolt 74. The thrust bearing 70 engages surface 76 of the clutch housing thereby supporting the clutch housing 42 and clutch bearing 43. To ensure that the thrust bearing 70 and clutch bearing 43 are sealed, the underside surface of the clutch housing 42 is counter-bored to form channel 78 to enable base plate 54 to be attached to the clutch housing 42 by bolts 79. A flexible cable or chain 80 is attached to the base plate 54 by any suitable means and attached to a stationary surface 52.

FIG. 5a shows the anti-rotation device with the locking pin 62 and flinger 63 in place and the cable or chain 80 attached to the stationary surface 52. Flinger 63 is provided to further reduce moisture and debris contamination of the clutch bearing 43 by providing an outwardly sloping rotating surface above the clutch bearing that will effectively disperse moisture or debris dripping down clutch shaft 44.

In operation, a fin-fan system in accordance with the invention is thereby permitted to rotate in one-direction only, thereby preventing windmilling of the fan blades 14 when the motor 18 is shut-off. As the motor 18 is shut-off, frictional forces within the bearings 13, motor 18 and clutch bearing 43 will slow and stop the fan blades 14. Once stopped, air currents circulating over the fan blades 14 will not cause backward rotation of the fin-fan system 10. At start-up, the motor 18 will accelerate the fan blades 14 from stop to a normal operating speed without abnormal stresses being applied to the motor 18, bearings 13 or belt 22.

If maintenance is required on the system, the motor 18 is turned off and the system 10 will slow to a stop. Locking pin 62 is inserted through the locking plate 60 and base plate 54 to prevent accidental rotation of the shaft 12 during maintenance procedures.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. An anti-rotation fin-fan device comprising:
   a vertical shaft having a fan end with fan blades and a drive end, the vertical shaft rotatable about its vertical axis;
   a shaft drive sprocket on the drive portion of the vertical shaft;
   a shaft bushing on the drive end of the vertical shaft, the shaft bushing having a keyway to provide positive engagement between the vertical shaft and shaft bushing, the vertical shaft having a shaft receiving portion for receiving the vertical shaft and a shaft bushing flange, the shaft bushing flange having threaded bores;
   a clutch adaptor for engagement with the shaft bushing and a clutch shaft, the clutch adaptor having a clutch shaft receiving portion for engagement with the clutch shaft and a clutch flange portion for engagement with the shaft bushing flange, the clutch shaft receiving portion having an internal diameter greater than the diameter of the vertical shaft, the clutch adaptor flange having bores for alignment with the threaded bores, the bores for receiving respective bolts for engagement of the clutch adaptor to the shaft bushing;
   a clutch housing having an open bore for mounting a top seal, a one-way clutch bearing and a base plate, the open bore having a shaft receiving end for receiving the clutch shaft within the one-way clutch bearing and a base plate end, the base plate for covering the base plate end;
   a vibration damping bushing for attachment to the base plate for absorbing vibrational movement of the fin-fan device;
   a locking pin for preventing rotation of the clutch adaptor with respect to the base plate, the locking pin engageable with both the clutch adaptor and base plate.

2. A one-way clutch device for use with a rotating vertical shaft having an exposed lower end for preventing rotation of the vertical shaft in one direction, the one-way clutch device comprising:
   a clutch adaptor for engagement with the vertical shaft and a clutch shaft, the clutch adaptor having a clutch shaft receiving portion for engagement with the clutch shaft and a clutch flange portion for engagement with the vertical shaft, the clutch shaft receiving portion having an internal diameter greater than the diameter of the vertical shaft,
   a clutch housing having an open bore, the clutch housing for mounting a one-way clutch bearing and a base plate, the open bore having a shaft receiving end for receiving the clutch shaft and a base plate end, the base plate for covering the base plate end.

3. A one-way clutch as in claim 2 further comprising
   a vibration damping assembly on the base plate for absorbing vibrational movement of the one-way clutch.

4. A one-way clutch as in claim 3 further comprising:
   a locking pin for preventing rotation of the clutch adaptor with respect to the base plate, the locking pin engageable with both the clutch adaptor and base plate.

5. In fin-fan device having a vertical shaft with a fan end and a drive end, the shaft rotatable about its vertical axis, the vertical shaft having a shaft drive sprocket on the drive portion of the vertical shaft and a belt engaged with the shaft drive sprocket between the shaft drive sprocket and a motor, the motor enabling forward rotation of the vertical shaft, the improvement comprising:
   one-way clutch means operatively engaged between the vertical shaft and an immoveable surface, the one-way clutch means for permitting one-way rotation of the vertical shaft when the motor is operational and preventing backward rotation of the vertical shaft when the motor is non-operational, the one-way clutch means having a stationary portion and a rotating portion; wherein the vertical shaft is provided with a shaft bushing engageable with the drive end of the vertical shaft and the one-way clutch means, the shaft bushing having a keyway to provide positive engagement between the shaft and shaft bushing, the shaft bushing having a shaft bushing flange and a shaft receiving portion for receiving the vertical shaft.

6. The fin-fan device of claim 5, wherein the rotating portion comprises a clutch adaptor for engagement with the shaft bushing and a clutch shaft, the clutch adaptor having a clutch shaft receiving portion for engagement with the clutch shaft and a clutch flange portion for engagement with the shaft bushing flange portion, the clutch shaft receiving portion having an internal diameter greater than the diameter of the vertical shaft.

7. The fin fan device of claim 5 wherein the stationary portion comprises a clutch housing with a one-way clutch bearing.

8. The fin fan device of claim 7 wherein the clutch housing comprises an open bore for mounting the one-way clutch bearing and a base plate, the open bore having a shaft receiving end for receiving the clutch shaft and a base plate end, the base plate for selectively covering the base plate end.

9. The fin-fan device of claim 8 wherein the one-way clutch bearing further comprises a top seal.

10. The fin-fan device of claim 5 further comprising locking means wherein the one-way clutch means may be locked to prevent rotation of the shaft in either the forward or backward direction.

11. The fin-fan device of claim 10 wherein the locking means comprises:

a locking plate on the clutch adaptor;

a lower locking plate on the stationary portion for receiving a locking pin, the locking pin passing through the locking plate and lower locking plate.

12. The fin-fan device of claim 11 further comprising a vibration damping assembly on the stationary portion for absorbing vibrational movement of the one-way clutch.

13. The fin-fan device of claim 5 wherein the stationary portion is attached to a stationary surface by a torque arm extending perpendicularly to the axial direction of the shaft.

14. A one-way clutch device for use with a rotating vertical shaft having an exposed lower end for preventing rotation of the vertical shaft in one direction, the one-way clutch device comprising:

one way clutch means operatively engaged between the vertical shaft adjacent the lower end and an immoveable surface;

thrust bearing means on the lower end of the vertical shaft for supporting the one-way clutch means on the vertical shaft.

15. A one-way clutch device as in claim 14 wherein the one-way clutch means comprises:

a clutch adaptor for engagement with the vertical shaft;

a clutch shaft on the clutch adaptor for engagement with a one-way clutch bearing;

a clutch housing for receiving the one-way clutch bearing, the clutch housing supported by the thrust bearing means.

16. A one-way clutch device as in claim 15 wherein the thrust bearing means comprises a thrust bearing and an end plate on the lower end of the clutch shaft, the end plate supporting the thrust bearing within a bore on the underside of the clutch housing.

17. A one-way clutch device as in claim 15 wherein the thrust bearing means is received within a bore on the underside of the clutch housing.

18. A one-way clutch device as in claim 15 further comprising:

a top seal on the one-way clutch for inhibiting moisture and debris contamination of the one-way clutch bearing.

19. A one-way clutch device as in claim 15 further comprising:

a thrust bearing cover on the underside of the clutch housing for covering the thrust bearing means.

20. A one-way clutch device as in claim 15 further comprising a non-rigid link between the clutch housing and the immoveable surface for preventing rotation of the clutch housing.

21. A one-way clutch device as in claim 20 wherein the non-rigid link is a chain or cable.

22. A one-way clutch device as in claim 15 further comprising a flinger on the clutch shaft for further inhibiting moisture and debris contamination of the one-way clutch bearing.

23. A one-way clutch device for use with a rotating vertical shaft having an exposed lower end for preventing rotation of the vertical shaft in one direction, the one-way clutch device comprising:

a shaft bushing on the exposed lower end of the vertical shaft, the shaft bushing having a keyway to provide positive engagement between the vertical shaft and shaft bushing, the shaft bushing having a shaft receiving portion for receiving the vertical shaft and shaft bushing flange, the shaft bushing flange having threaded bores;

a clutch adaptor for engagement with the shaft bushing and a clutch shaft, the clutch adaptor having a clutch shaft receiving portion for engagement with the clutch shaft and a clutch flange portion for engagement with the shaft bushing flange, the clutch adaptor having an internal diameter greater than the diameter of the vertical shaft, the clutch adaptor flange having bores for alignment with the threaded bores, the bores for receiving respective bolts for engagement of the clutch adaptor to the shaft bushing;

a clutch housing having an open bore, the clutch housing for mounting a top seal, a one-way clutch bearing, thrust bearing and a base plate, the open bore having a shaft receiving end for receiving the clutch shaft within the one-way clutch bearing and a base plate end, the base plate for covering the base plate end, the thrust bearing engaged on the lower end of the vertical shaft with an end plate for supporting the clutch housing on the vertical shaft;

a locking pin for preventing rotation of the clutch adaptor with respect to the base plate, the locking pin engageable with both the clutch adaptor and base plate;

a non-rigid link between the clutch housing and the immoveable surface for preventing rotation of the clutch housing.

\* \* \* \* \*